C. W. SALADEE.
ANIMAL-TRAP.
No. 173,500. Patented Feb. 15, 1876.
2 Sheets—Sheet 2.
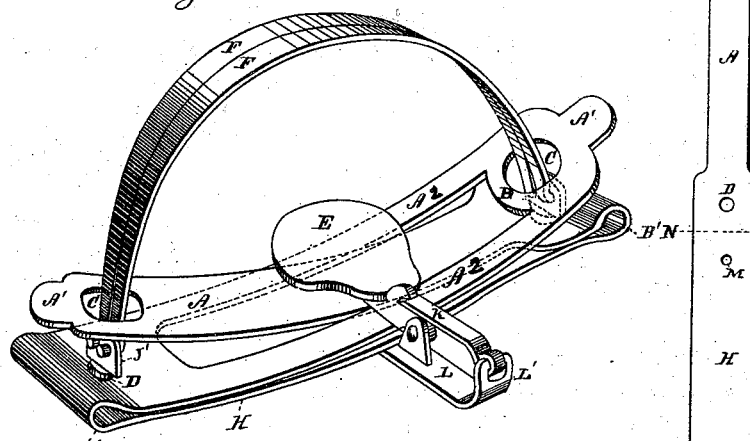
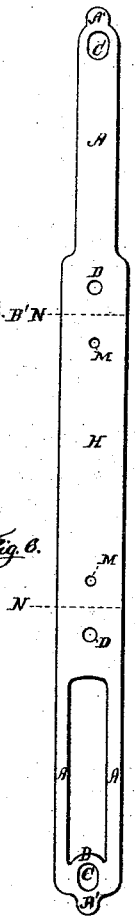
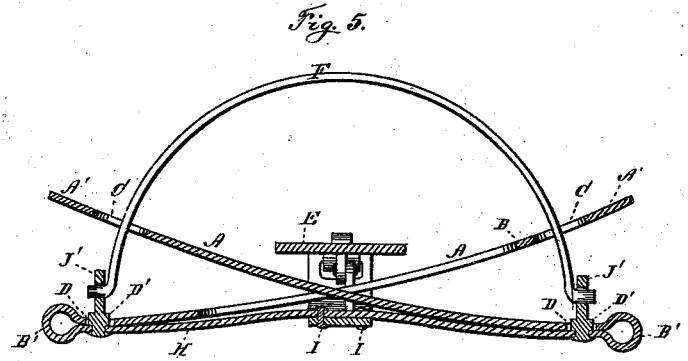
WITNESSES: INVENTOR:

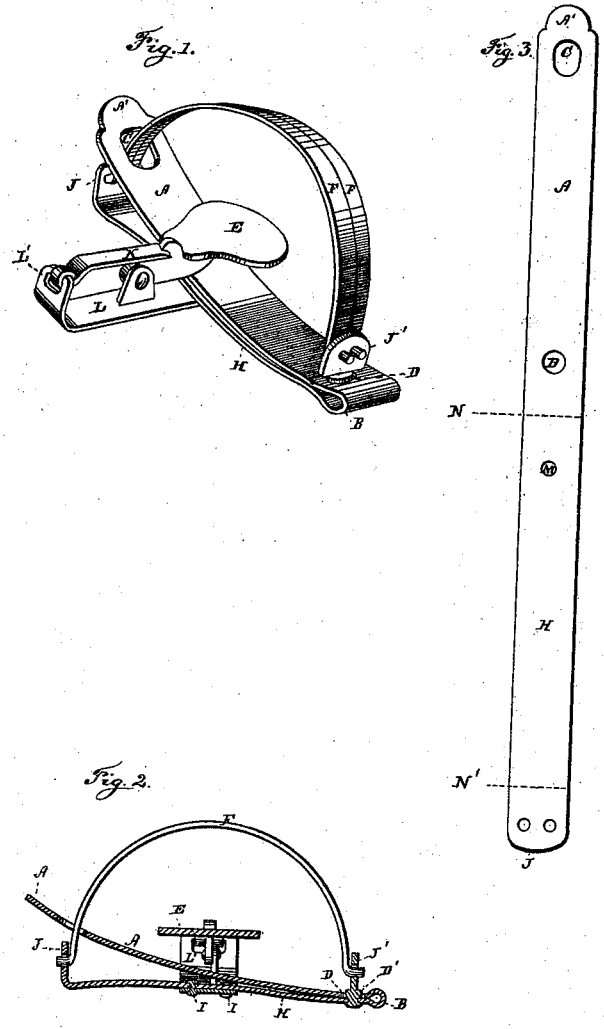

UNITED STATES PATENT OFFICE.

CYRUS W. SALADEE, OF WASHINGTON, DISTRICT OF COLUMBIA.

IMPROVEMENT IN ANIMAL-TRAPS.

Specification forming part of Letters Patent No. 173,500, dated February 15, 1876; application filed January 18, 1876.

*To all whom it may concern:*

Be it known that I, CYRUS W. SALADEE, of Washington city, in the District of Columbia, have invented certain Improvements in Animal-Traps, of which the following is a specification, embodying my said invention.

To enable others skilled in the art to make and use my invention, I herewith submit the following general description.

My invention consists in forming the bed-plate and spring of one piece of metal, extending the bed-plate at one or both ends beyond the ends of the jaws, and bending it up at such outer end to form the spring which overlies the whole length of the bed-plate, and embraces the bearings of the jaws at both ends of the same.

I thus secure a greater length of spring within a short space and provide a powerful trap, which is at the same time lighter, more compact, and cheaper than the ordinary steel traps.

In the drawings, Figure 1 is a perspective view of a trap upon the plan of my invention. Fig. 2 is a longitudinal section of the same, and Fig. 3 is a plan view of the bed-plate and spring before being bent into shape. Fig. 4 is a perspective view of a modification of my invention, representing both ends of the bed-plate bent into form as springs, and operating upon both sides of the jaws. Fig. 5 is a longitudinal section of the same, and Fig. 6 is a plan view of the bed-plate and springs before being bent into shape.

In the first modification, shown in Figs. 1, 2, and 3, I represent a small or single trap, while in Figs. 4, 5, and 6 I show a large or double trap, the first having but one spring and the second has two springs, the one being intended for small game and vermin and the other for larger animals.

In Fig. 3 we have a plan view of a strip of steel perforated with suitable openings and holes. The end J is bent up at the cross-dotted line N', so as to form a bearing for one end of the jaws. The opposite end of the strip A is now bent back and over the end H in such manner that the portion H is made to serve as the bed-plate, and the other, A, as the springs of the trap, as is clearly shown in the Figs. 1 and 2. J' is a bearing to receive and hold that end of the jaws, and is made to pass through the hole D of the spring A, and into the hole M of the bed-plate H, and there securely riveted into position. In all other respects this trap is, or may be, constructed in the usual way.

For the larger or double trap the bed-plate H is extended at both ends to form springs A and $A^2$, as clearly shown in the drawings, Figs. 4, 5, and 6, while, in every other respect, it is the same as the single-spring trap seen in Figs. 1, 2, and 3.

I claim—

1. A steel trap, having its bed-plate extended at one or both ends to form the spring or springs of the trap, and bent into position so as to overlie the bed-plate and embrace the bearings of the jaws, substantially as and for the purpose set forth.

2. A steel trap when provided with a spring, overlying the entire length of its bed-plate, and having the latter extended at one or both ends beyond the bearings of the jaws, and combined with a correspondingly-extended spring or springs, and the jaws of the trap.

CYRUS W. SALADEE.

Witnesses:
HERM. LAUTER,
J. W. HAMILTON JOHNSON.